3,079,426
PHENYLTHIOTOLYL BENZOATES
Laurence A. Pursglove, Midland, Mich., assignor to The Dow Chemical Company, Midland, Mich., a corporation of Delaware
No Drawing. Filed Sept. 1, 1961, Ser. No. 135,422
2 Claims. (Cl. 260—476)

The present invention is concerned with α-phenylthiotolyl esters and is particularly directed to α-phenylthiotolyl benzoates and to a method of preparing such compounds. The novel compounds correspond to the formula

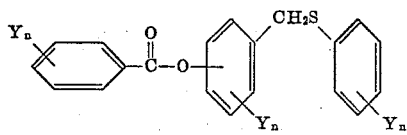

In the present specification and claims any substituent Y independently represents chlorine, bromine, lower alkyloxy or lower alkyl; an $n$ designates an integer from 0 to about 4 inclusive. The expression lower alkyl is used to designate an alkyl group being of from 1 to about 5 carbon atoms, inclusive.

The present compounds are yellow to colorless liquids or solids soluble in many common organic solvents such as chlorinated hydrocarbons, xylene, and lower alkyl ketones, but of very limited solubility in water. The present compounds are useful as herbicides against both terrestrial and aquatic plants, and as parasiticides; and are especially adapted to be employed to kill insects.

The compounds of the present invention may be prepared by causing a reaction between a halotolyl benzoate corresponding to the formula

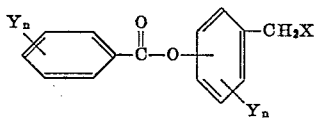

wherein X represents a halogen having an atomic weight greater than 25, and a benzenethiol or an alkali metal salt of a benzenethiol corresponding to the formula

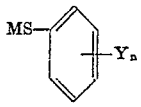

The alkali metal salt of the thiol may, if desired, be prepared in situ, by supplying to the reaction site the uncombined benzenethiol and a basic alkali metal compound. These may be supplied in any order or time sequence. Such salt may equally well be prepared in advance and supplied to the reaction in completed form. Also, the benzenethiol may be employed in uncombined form, in the presence of a hydrogen halide neutralizing agent.

In preparation of the present compounds the reaction between halotolyl benzoate and alkali metal salt of benzenethiol takes place smoothly with the production of the desired product and alkali metal halide of reaction. The reaction consumes the halotolyl benzoate and the alkali metal salt of the benzenethiol in equimolecular proportions. When employing the free benzenethiol reactant, the elements of hydrogen halide are evolved and, preferably, are immediately neutralized by hydrogen halide neutralizing agent. The reactants may be employed in any proportions, but as the proportions deviate more and more from equimolecular, unconsumed reactant appears correspondingly as impurity in the resulting reaction mixture.

The reaction takes place at temperatures from about room temperature to about 150° C. or above. Higher temperatures may damage some desired components of the reaction mixture. Within the said range, temperatures of from about 40° to about 105° C. bring about timely completion of the reaction with little or no danger of thermal damage to the reactants or products. Because many suitable solvents boil within this range, and thus conveniently limit reaction temperatures; and for the other stated reasons, it is a preferred temperature range.

The reaction goes forward well in an inert liquid reaction medium. Such medium may be chosen for, firstly, its boiling temperature which should preferably fall between about 40° and about 105° C., and secondly, as solvent for starting reactants. Advantageously, neutralized halide of reaction should be insoluble in, or of low solubility in reaction medium. Alternatively, starting reactants and by-product halide may be soluble but product insoluble in the said medium. A liquid that is solvent for all starting materials and products may be used but is less advantageous. Optionally, no reaction medium is employed.

In carrying out the reaction, the halotolyl benzoate and thiol or metallic thiol salt are mixed together, in reaction medium if such medium is employed; and thereafter maintained for a period of time at a reaction temperature, to carry the reaction to completion.

Upon completion of the reaction, neutralized halide of reaction typically a metallic or nitrogenous halide is removed: when, by reason of the solvent properties of other substances, such as solvents present, it precipitates as a solid in the reaction mixture it may be removed by filtration and the like. Thereafter, reaction medium, if employed, may be removed as by evaporation and the like.

The following examples illustrate the invention but are not to be construed as limiting it.

EXAMPLE 1

α-Phenylthio-o-Tolyl Benzoate

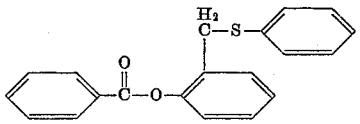

In the present example, the employed alkali metal salt of the employed benzenethiol is prepared in situ. Potassium hydroxide (14.5 g.) is dissolved in 150 milliliters absolute ethanol, cooled in an ice bath and treated with 28.5 grams (0.26 mole) of benzenethiol to prepare a potassium thiophenate solution. In a separate flask, 64 grams (0.26 mole) of α-chloro-o-tolyl benzoate is dissolved in 150 milliliters absolute ethanol at 45° C. The warm potassium thiophenate solution is added to the benzoate solution at room temperature over a 5-minute period (during addition the temperature rises to about 62° C.) and the resulting solution is heated at 62–80° C. for 3 hours. Potassium chloride of reaction precipitates and is removed by filtration and ethanol solvent evaporates to obtain a crude product, as an oily liquid. This liquid is fractionally distilled under subatmospheric pressure to obtain an α-phenylthio-o-tolyl benzoate product as a viscous, pale yellow liquid boiling at 195°–215° C. under 3 millimeters mercury pressure, absolute, and having at 25° C., a refractive index for the D line of sodium vapor light, of 1.6261.

The product compound of this example is specifically and strongly toxic to germinant seeds and emerging seedlings of crabgrass. Application as a wetting spray of an aqueous dispersion containing 100 parts of the said compound per million parts of aqueous dispersion to viable seeds of crabgrass under favorable growing conditions resulted in a heavy kill of the crabgrass seeds and seedlings.

In other preparations carried out in the manner of Example 1 the following products are prepared:

From α,4-dichloro-o-tolyl p-chlorobenzoate and sodium benzenethiolate, a 4-chloro-α-phenylthio-o-tolyl p-chlorobenzoate product; the same desired product and different by-product are obtained when employing α-bromo-4-chloro-o-tolyl p-chlorobenzoate and potassium benzene thiolate.

From α-chloro-o-tolyl benzoate and p-tertiarybutyl benzenethiol, with sodium bicarbonate as hydrogen halide neutralizing agent, an α(4-tertiarybutyl benzylthio)-o-tolyl benzoate product. The same desired product and different by-product are obtained when employing α-iodo-o-tolyl benzoate and lithium p-tert-butylbenzenethiolate.

From α,2-dichloro-p-tolyl benzoate and sodium-o-methoxy benzenethiolate, a 2-chloro-α-(o-methoxy phenylthio)-p-tolyl benzoate product.

From α-chloro-3-n-propyl-o-tolyl p-bromobenzoate and sodium p-chlorobenzenethiolate, a 3-n-propyl-α(p-chlorophenylthio)-o-tolyl p-bromobenzoate product.

From α,5-dibromo-o-tolyl p-isopentyloxy benzoate and sodium p-bromobenzenethiolate, a 5-bromo α-(p-bromophenylthio)-o-tolyl p-isopentyloxy benzoate.

From α-chloro-o-tolyl o-chlorobenzoate and m-chlorobenzenethiol, an α-(m-chlorophenylthio)-o-tolyl o-chlorobenzoate product, employing pyridine as hydrogen halide acceptor.

From α-chloro-p-tolyl benzoate and the sodium salt of p-n-pentylbenzenethiol, an α-(p-n-pentylphenylthio)-p-tolyl benzoate.

The compounds of the present invention are useful as herbicides. For such use, the unmodified compounds may be used. Preferably, the compounds are dispersed on an inert finely divided solid and the resulting preparation employed as a dust. Also, such preparations are advantageously dispersed in water with or without the aid of a wetting agent and the resulting aqueous suspensions employed as effective sprays. In other procedures, the compounds are employed in oil or other solvent or as a constituent of solvent-in-water or water-in-solvent emulsions or as aqueous dispersions thereof which are effectively applied as spray, drench, or wash.

The α-halo-o-tolyl benzoates employed as starting materials in the practice of the present invention are prepared in known procedures set forth in, for example, Berichte der Deutschen Chemischen Gesellschaft, 83, pages 569–570; also in U.S. Patent 2,965,673; and in co-pending application S.N. 758,673, filed September 3, 1958, now U.S. Patent 3,000,930. The benzenethiols are prepared in known procedures, such as those set forth in "Synthetic Organic Chemistry" (Wiley, N.Y.), 1953, by Wagner and Zook, page 778 and following.

I claim:

1. An α-phenylthiotolyl benzoate being of the formula

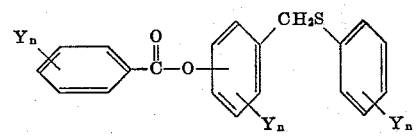

wherein any substituent Y independently is selected from the group consisting of chlorine, lower alkyloxy, and lower alkyl and $n$ is an integer from 0 to about 4, inclusive; the expression lower alkyl being used to designate an alkyl group being of from 1 to about 5 carbon atoms, inclusive.

2. α-Phenylthio-o-tolyl benzoate.

References Cited in the file of this patent

Hickinbottom: Reactions of Organic Compounds (London, 1948), pages 130–132.